(12) United States Patent
Sowers, Jr. et al.

(10) Patent No.: US 11,905,833 B2
(45) Date of Patent: Feb. 20, 2024

(54) SYSTEM AND METHOD OF EXTRACTING AND COLLECTING WATER FROM A REGOLITH

(71) Applicant: COLORADO SCHOOL OF MINES, Golden, CO (US)

(72) Inventors: George F. Sowers, Jr., Morrison, CO (US); Christopher B. Dreyer, Lakewood, CO (US)

(73) Assignee: COLORADO SCHOOL OF MINES, Golden, CO (US)

( * ) Notice: Subject to any disclaimer, the term of this patent is extended or adjusted under 35 U.S.C. 154(b) by 933 days.

(21) Appl. No.: 16/290,076

(22) Filed: Mar. 1, 2019

(65) Prior Publication Data

US 2019/0271228 A1  Sep. 5, 2019

Related U.S. Application Data

(60) Provisional application No. 62/637,789, filed on Mar. 2, 2018.

(51) Int. Cl.
*E21C 51/00* (2006.01)
*B64G 4/00* (2006.01)
*E21B 36/00* (2006.01)

(52) U.S. Cl.
CPC .............. *E21C 51/00* (2013.01); *B64G 4/00* (2013.01); *E21B 36/00* (2013.01)

(58) Field of Classification Search
CPC ...................................................... E21C 51/00
See application file for complete search history.

(56) References Cited

U.S. PATENT DOCUMENTS

| | | | | |
|---|---|---|---|---|
| 3,337,418 A | * | 8/1967 | Halacy, Jr. ................ | C02F 1/18 52/2.21 |
| 4,290,417 A | * | 9/1981 | Peters .................... | F24S 90/10 165/104.19 |
| 4,306,613 A | * | 12/1981 | Christopher .......... | F25B 23/006 165/104.34 |
| 2004/0261982 A1 | * | 12/2004 | Watanabe ................ | F28F 1/40 165/150 |

(Continued)

OTHER PUBLICATIONS

Linne Et al., "Extraction of Volatiles from Regolith or Soil on Mars, the Moon, and Asteroids" (Year: 2017).*

(Continued)

*Primary Examiner* — Jason Lau
(74) *Attorney, Agent, or Firm* — Sheridan Ross P.C.

(57) ABSTRACT

A system and method of extracting frozen water from soil or a regolith and capturing the water is provided. More specifically, the present disclosure relates to a water collection system to extract and collect water from regolith. The system is configured to heat the regolith in situ to a temperature at which frozen water in the regolith will vaporize. The water vapor is then captured and collected. In one embodiment, the system includes a power system to provide energy to the regolith to heat the regolith, an enclosure to trap the water vapor released from the heated regolith, and a container operably interconnected to the enclosure to collect the water vapor. In one embodiment, the system can be positioned at a production facility on the Earth, the Moon, Mars, or an asteroid.

16 Claims, 6 Drawing Sheets

(56) References Cited

U.S. PATENT DOCUMENTS

2014/0048121 A1* 2/2014 Schwartz .............. F24S 30/425
126/694
2015/0107983 A1* 4/2015 Maiti ................... B01D 1/0082
202/234
2019/0017729 A1* 1/2019 Hyatt .................... F24S 30/452

OTHER PUBLICATIONS

"Thermal Mining on the Moon," Colorado School of Mines, Jan. 2018, 18 pages.
Lewis, "Incredible Technology: How to Mine Water on Mars," Space, Dec. 23, 2013, retrieved from https://www.space.com/24052-incredible-tech-mining-mars-water.html, 6 pages.
Ethridge, "Experiments for Prospecting and Mining Water from Lunar Permafrost from boreholes using RF." In-Space Resources, 2015, 1 page.
Ethridge et al., "Microwave Extraction of Volatiles for Mars Science and ISRU," in "Concepts and Approaches for Mars Exploration," 2012, 2 pages.

* cited by examiner

SYSTEM AND METHOD OF EXTRACTING AND COLLECTING WATER FROM A REGOLITH

CROSS REFERENCE TO RELATED APPLICATIONS

This application claims the benefit of the filing date of U.S. Provisional Application No. 62/637,789 entitled "System and Method of Extracting Water from Regolith" having a filing date of Mar. 2, 2018, the entire contents of which are incorporated herein by reference.

FIELD OF THE INVENTION

The present invention is related to systems and methods of extracting and collecting water frozen in a regolith. More specifically, the present invention provides systems and methods of heating regolith such that frozen water present in the regolith will sublimate as water vapor which can be collected.

BACKGROUND

Space exploration is limited by the difficulty of moving payload, including people, equipment, and supplies, from the Earth's surface into orbit. In the past, the primary limitations were technical. However, space launch vehicles have become more reliable and many technical limitations have been overcome. Today, the primary limitation is the cost of delivery of the payload to orbit. The cost is often measured in dollars per pound of payload. For example, the cost to lift 1 lb. to low Earth orbit (between about 150 and 1,400 miles above the Earth's surface) may be up to about $10,000 depending on the launch vehicle used. The cost to lift 1 lb. higher, such as to geostationary orbit or the Moon, is considerably greater.

One item that is necessary in space is fuel for rocket engines. Water can be converted into fuel for rocket engines because water can be electrolyzed into Hydrogen and Oxygen. The Hydrogen and Oxygen can be liquified and used as energy sources, including as propellants for rocket engines.

Water ice is mixed in soil or regolith on the Moon, on Mars, and on some asteroids. For example, in some lunar craters and permanently shadowed regions of the Moon, the lunar regolith contains from approximately 5 to 10 percent water content by mass. Water on the Moon is concentrated at the poles and in other areas without any light. These areas are called permanently shadowed regions. Permanently shadowed regions exist on the surface of the Moon at about 40° C. above absolute zero (40 K) at a near vacuum with no atmosphere. Areas of the Moon's surface that are exposed to light tend to warm to a temperature above 40 K, causing water to sublimate and escape into the atmosphere.

Water ice is also present in regolith on Earth in locations such as Antarctica where soil temperatures are below freezing. On the Earth, the water can be recovered by excavating the regolith with heavy equipment. The regolith can then be heated to extract the water. However, it is not feasible to recover water from regolith in this manner on the Moon or other extra-terrestrial bodies due to the excessive cost of transporting the excavation equipment and the fuel required to operate the equipment into space.

Accordingly, there is a need for systems and methods of extracting water from regolith that are light-weight and reliable.

SUMMARY

The present invention is directed systems and methods of extracting water from ice in a regolith so that the water can be collected. In certain embodiments, the water could be extracted from a regolith located on a non-terrestrial object, such as the Moon, another planet, or an asteroid. More specifically, the systems and methods of embodiments of the present invention could be used to collect water from any type of soil at any location and are not limited to extracting and collecting water from a regolith located on the Moon.

One aspect of the present invention is to provide a thermal system and method configured to extract water from a regolith. The thermal system is operable to heat the regolith in situ to a temperature sufficient to cause water ice present in the regolith to sublimate as water vapor. In one embodiment, the thermal system can heat the regolith from a temperature of between about 40-60 K to a temperature of at least about 210 K. In another embodiment, the thermal system can raise the temperature of the regolith from the freezing point of water to a temperature at which water will melt. Optionally, the thermal system can increase the temperature of the regolith to a point at which water will vaporize. The thermal system is configured to trap and collect water that escapes from the regolith. The water can be in a liquid or a gaseous state. In one embodiment, the thermal system is configured to trap and collect water vapor. In this manner, the thermal system of the present invention can recover water from regolith for approximately one-half of the cost of extracting water by excavation of regolith.

In one embodiment, the thermal system heats the regolith by transferring energy to a surface of the regolith. Additionally, or alternatively, the regolith below the surface can be heated by the thermal system. For example, in one embodiment, the thermal system is configured to transfer energy through boreholes formed in the regolith to heat the regolith to a predetermined depth. In one embodiment, the thermal system directs sunlight onto the regolith. The sunlight may be reflected by mirrors or solar concentrators.

The thermal system may also include a fluid to transfer energy to the regolith. The fluid can be heated by sunlight. A pipe can transport the heated fluid to the regolith. A pump can be interconnected to the pipe to direct the heated fluid to the regolith. The pipe may be positioned in contact with the regolith. In one embodiment, at least a portion of the pipe contacts a surface of the regolith. In another embodiment, a portion of the pipe is buried in the regolith. Optionally, the pipe can be directed into boreholes such that the fluid can heat the regolith to a predetermined depth.

In another embodiment, the thermal system includes an electric heater to transfer energy to the regolith. In one embodiment, the electric heater is operable to generate heat that is directed to the regolith. Optionally, the electric heater can be positioned in contact with a surface of the regolith. In another embodiment, the electric heater is positioned in a borehole formed in the regolith. The electricity for the heater can be supplied by a photovoltaic system.

Another aspect of the present invention is an enclosure which is positionable over the regolith. The enclosure is configured to trap water released from the regolith. The water may be in a gaseous state. Accordingly, in one embodiment, the enclosure is configured to trap water vapor. In another embodiment, the enclosure is substantially dome-shaped or hemispherical. The enclosure is configured to be moved periodically to new positions within a production site.

In one embodiment, the enclosure is substantially impermeable to water. At least a portion of the enclosure may be transparent or translucent. Optionally, the enclosure can include a lens or optics configured to direct sunlight onto the regolith. In one embodiment, a portion of an interior surface of the enclosure is capable of reflecting light onto regolith covered by the enclosure.

In one embodiment, the enclosure has a diameter of up to approximately 29 m. Optionally, the enclosure can cover approximately 650 square meters of regolith. However, one of skill in the art will appreciate that the enclosure may be of any size or shape.

The enclosure includes a container configured to collect the water vapor. The container can be releasably associated with the enclosure. In this manner, when a predetermined amount of water has been collected in the container, the container may be removed from the enclosure. The enclosure may include channels or ridges to direct condensed liquid water to the container.

In one embodiment, the container is positioned outside of the enclosure. A conduit can releasably interconnect the container to the enclosure. The water trapped by the enclosure can pass through the conduit to be collected within the container. In one embodiment, the container is not heated. Accordingly, water which collects in the container will cool and subsequently freeze.

Another aspect of the present invention is a solar power system. The solar power system is configured to collect solar energy which can be transferred to the regolith. In one embodiment, the solar power system includes a reflector or a mirror. The mirror is configured to direct sunlight onto the regolith. Accordingly, the mirror can be positioned in a location that receives at least some light directly from the Sun. In one embodiment, the mirror can focus sunlight onto the enclosure. The enclosure can be spaced from the location of the mirror. In one embodiment, the enclosure is positioned in a second location that receives substantially no light directly from the Sun. Optionally, the system can include three or more mirrors. The mirrors may be positioned around the enclosure.

In another embodiment, the solar power system includes a concentrator to heat a fluid. After the fluid is heated to a predetermined temperature, the fluid is transported to the regolith. Optionally, the system can include a pipe and a pump to transport heated fluid to the regolith. In one embodiment, the pipe can be positioned below the surface of the regolith.

In still another embodiment, the solar power system comprises a photovoltaic power system operable to convert sunlight into electricity. Electricity generated by the solar power system can be used to heat the regolith. In one embodiment, the system includes an electric heater. The electric heater can be positioned within the enclosure. Optionally, the electric heater may be positioned in a borehole formed in regolith beneath the enclosure.

One aspect of the present invention is to provide a water collection system to extract and collect water from a regolith or soil. The system generally includes, but is not limited to: (1) a power system to provide energy to the soil, the power system being configured to transfer sufficient energy to the soil to heat the soil to a temperature at which frozen water in the soil will change phase; (2) an enclosure to trap water released from the heated soil; and (3) a container operably interconnected to the enclosure to collect the water. In one embodiment, the power system heats the soil to a temperature at which the frozen water will sublimate into water vapor.

In one embodiment, the power system includes a concentrator to direct sunlight onto the soil. Optionally, the sunlight from the concentrator passes through the enclosure. The concentrator can be a mirror configured to reflect sunlight to the enclosure. Optionally, the mirror can concentrate sunlight. In one embodiment, the mirror is concave. Alternatively, the mirror can be generally planar. Additionally, or alternatively, the concentrator can include a lens. The lens can be configured to concentrate or focus the sunlight onto a target, such as the enclosure or a mirror. The power system can be configured to heat soil covered by the enclosure to at least approximately 210 K, or to approximately 240 K or more.

Additionally, or alternatively, in another embodiment, the system includes an electric heater powered by the power system. The electric heater can be positioned under the enclosure to heat the soil.

Optionally, the enclosure is dome shaped and includes an open bottom facing the soil. The enclosure may be substantially impermeable to water. In one embodiment, the enclosure is configured to trap and collect water vapor. The volume enclosed by the enclosure and the soil can be approximately a vacuum. In one embodiment, the system is operable to collect water from soil when pressure within the enclosure is on the order of approximately 0.0001 atm, or less than approximately 10 Pascals.

Another aspect of the present invention is a method of extracting and collecting water from soil. The method includes one or more of, but is not limited to: (1) positioning a power system at a production site, the power system configured to transfer energy to the soil to heat the soil; (2) positioning an enclosure at the production site to trap water released from the heated soil; and (3) interconnecting a container to the enclosure to collect the water. In one embodiment, the power system is operable to heat the soil to a temperature at which frozen water in the soil will vaporize. The method can include positioning the enclosure in a permanently shadowed region of the Moon. For example, the enclosure can be positioned in a lunar crater.

In one embodiment, the method includes directing sunlight onto the soil with a concentrator of the power system. The method can include positioning the concentrator in a region of the Moon that is not permanently shadowed. In one embodiment, the concentrator is a reflector, such as a mirror.

In another embodiment, the method includes positioning a heater of the power system within the enclosure. The heater can be an electric heater. Additionally, or alternatively, the heater can include a fluid, the heater being operable to extract heat from the fluid. The fluid can be heated the power system. The heater can be a pipe or conduit through which fluid can flow.

In still another embodiment, the method may include directing a fluid heated by the power system through a conduit positioned within the enclosure. The fluid can be liquid or gaseous water.

In one embodiment, the method includes creating a borehole in the regolith. The method may optionally include transferring energy into the borehole.

The method may further include moving the enclosure to another position at the production site. In one embodiment, the method further includes measuring a concentration of water in the soil. Optionally, the enclosure can be moved when the concentration of water in the soil is at or below a predetermined level. For example, the method can include moving the enclosure when the concentration of water in the soil is less than approximately 4%, or less than approximately 3%. In one embodiment, the production site is located on the Moon.

It is another aspect of the present invention to provide a system to extract frozen water from a soil or regolith in a low pressure environment and collect the water. The system generally includes one or more of, but is not limited to: (1) an enclosure configured to be positioned on the soil to define an enclosed space above the soil, the enclosure being configured to transmit solar energy from an exterior of the enclosure into the enclosed space and to retain heat within the enclosed space; (2) a container with an internal chamber, the container configured to be interconnected to the enclosure such that water vapor within the enclosed space can move into the internal chamber for collection, the container being configured to freeze water vapor in the internal chamber; and (3) a solar concentrator operable to direct solar energy to the enclosure to heat the soil within the enclosed space and cause frozen water in the soil to sublimate to a gaseous state.

In one embodiment, the system is operable to collect frozen water from soil on the Moon, a planet such as Mars, or an asteroid. Optionally, the system can be packaged for transport by a space launch vehicle into space. Accordingly, in one embodiment the enclosure, the container, and the solar concentrator are packed within a payload fairing of a space launch vehicle.

The container can optionally include a radiator operable to cool the internal chamber to a temperature that is lower than a temperature of soil within the enclosed space. Additionally, or alternatively, the container can include a vein structure. The vein structure can be configured to transmit heat to the radiator. Optionally, the vein structure extends from an interior surface of the container into the internal chamber.

In one embodiment, the solar concentrator is a mirror. The mirror can optionally be concave.

Additionally, or alternatively, the solar concentrator is configured to be positioned at a first location that receives at least some sunlight. In contrast, the enclosure is configured to be positioned in a second location that receives substantially no sunlight. Accordingly, in one embodiment, the solar concentrator is spaced from the enclosure. In one embodiment, the solar concentrator is positioned at least 10 m from the enclosure.

Optionally, the solar concentrator can include a base. The base can be configured to have a variable length to raise the solar concentrator above the enclosure such that the solar concentrator receives at least some sunlight. Optionally, the base is configured to telescope, bend, or fold to provide the variable length. Additionally, or alternatively, the base can include a scissor's lift. In one embodiment, the solar concentrator is mobile. Additionally, or alternatively, the solar concentrator can be configured to rotate or pivot to track the sun and reflect sunlight onto the enclosure.

In one embodiment, the enclosure comprises a material that is impermeable to water vapor. In another embodiment, the material of the enclosure can transmit solar energy from the solar concentrator into the enclosed space. Optionally, the enclosure includes a window and/or optics to transmit solar energy from the solar concentrator into the enclosed space. The enclosure may further comprise a skirt. The skirt can be positioned at a lower portion of the enclosure. In one embodiment, the skirt is operable to conform to the surface of the regolith. In this manner, the skirt is configured to form a substantially continuous barrier to limit or prevent water vapor from escaping through gaps between the enclosure and the regolith.

One aspect of the present invention is a method of extracting frozen water from a soil or regolith in a low pressure environment and collecting the water. The method comprises: (1) positioning an enclosure at a first location on a surface of the soil to define an enclosed space, the first location receiving substantially no light directly from the Sun; (2) directing solar energy to the enclosure with a solar concentrator, the solar concentrator being positioned to receive at least some light directly from the Sun, such that the solar energy heats the soil under the enclosure above an ambient temperature of less than approximately 60 K which causes frozen water in the soil changes phase into water vapor; and (3) connecting a container with an internal chamber to the enclosure, an interior temperature of the internal chamber being lower than a temperature of the heated soil under the enclosure such that water vapor from the enclosed space collects within the internal chamber and is frozen.

In one embodiment, the enclosure is positioned at a production site located on the Moon, a planet such as Mars, or an asteroid. Accordingly, the method can further comprise transporting the enclosure, the solar concentrator, and the container to the Moon, a planet, or an asteroid. In one embodiment, the method includes positioning the enclosure, the solar concentrator, and the container within a payload fairing of a space launch vehicle. In one embodiment, the method includes transporting the enclosure to the Moon.

The method can further include positioning the solar concentrator at a second location. In one embodiment, the second location is spaced a predetermined distance from the first location. The predetermined distance can be greater than 10 m.

In one embodiment, directing solar energy to the enclosure heats the soil to a temperature of greater than approximately 200 K and less than approximately 270 K. Additionally, or alternatively, after directing solar energy to the enclosure, pressure within the enclosed space increases to less than approximately 1 pound per square inch.

Yet another aspect of the present invention is a thermal system to collect water from a regolith on the Moon, comprising: (1) an enclosure positioned on the regolith at a location that receives substantially no light directly from the Sun, the enclosure defining an enclosed space above the regolith, the enclosure including a body that is impermeable to water vapor; (2) a solar concentrator positioned to receive at least some light directly from the Sun, the solar concentrator operable to direct solar energy to the enclosure to heat the regolith under the enclosed space such that frozen water in the regolith sublimates to a gaseous state; and (3) a container including an internal chamber interconnected to the enclosure, the container configured to receive water vapor from the enclosed space and freeze the water vapor that enters the internal chamber.

In one embodiment, the container includes a radiator. The radiator is configured to release or transfer heat from the container. The radiator can extend from an exterior surface of the container. The radiator can be formed of a material that is the same as, or different from, a material of the container.

Optionally, a vein structure extends from an interior surface of the container into the internal chamber. The vein structure can be configured to transfer heat away from the internal chamber of the container. In this manner, the vein structure is operable to reduce a temperature within the internal chamber. In one embodiment, the vein structure can be formed of a material that is the same as, or different from, a material of the container. In another embodiment, the vein structure is configured to transmit heat to the radiator.

Optionally, the solar concentrator is a mirror. In one embodiment, the mirror is concave. The solar concentrator can be spaced a predetermined distance from the enclosure. In one embodiment, the solar concentrator is positioned at least 10 m from the enclosure.

Optionally, the solar concentrator can include a base. The base can be configured to raise or lower the solar concentrator relative to a surface of the regolith. In this manner, the base can move the solar concentrator such that the solar concentrator receives at least some sunlight. In one embodiment, the base is configured to telescope, bend, fold, or scissor lift to raise the solar concentrator above the enclosure. In one embodiment, the solar concentrator is mobile. Additionally, or alternatively, the solar concentrator can be configured to rotate or pivot to track the sun and reflect sunlight onto the enclosure.

In one embodiment, the regolith under the enclosed space is heated to a temperature of between approximately 200 K to approximately 270 K. Optionally, a pressure within the enclosed space defined by the enclosure can increase to less than approximately 1 pound per square inch. In another embodiment, the thermal system can increase the pressure within the enclosure to less than approximately 100 Pascals, for example, or less than approximately 50 Pascals or 20 Pascals.

The enclosure can comprise a material that is impermeable to water vapor. In another embodiment, the material of the enclosure can transmit solar energy from the solar concentrator into the enclosed space. Optionally, the enclosure includes a window and/or optics to transmit solar energy from the solar concentrator into the enclosed space. In one embodiment, the enclosure includes a material or a coating selected to reflect heat energy inwardly back into the enclosed space. The enclosure may further comprise a skirt operable to conform to the surface of the regolith.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range, or to any value within the range without deviating from the invention.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

The Summary is neither intended, nor should it be construed, as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary as well as in the attached drawings and the Detailed Description and no limitation as to the scope of the present invention is intended by either the inclusion or non-inclusion of elements or components. It is contemplated that various features and devices shown and/or described with respect to one embodiment may be combined with or substituted for features or devices of other embodiments regardless of whether or not such a combination or substitution is specifically shown or described herein. Additional aspects of the present invention will become more readily apparent from the Detailed Description, particularly when taken together with the drawings.

BRIEF DESCRIPTION OF THE FIGURES

The accompanying drawings, which are incorporated herein and constitute a part of the specification, illustrate embodiments of the invention and together with the Summary given above and the Detailed Description given below serve to explain the principles of these embodiments. In certain instances, details that are not necessary for an understanding of the disclosure or that render other details difficult to perceive may have been omitted. It should be understood, of course, that the present invention is not necessarily limited to the particular embodiments illustrated herein. Additionally, it should be understood that the drawings are not necessarily to scale.

Figure 1:
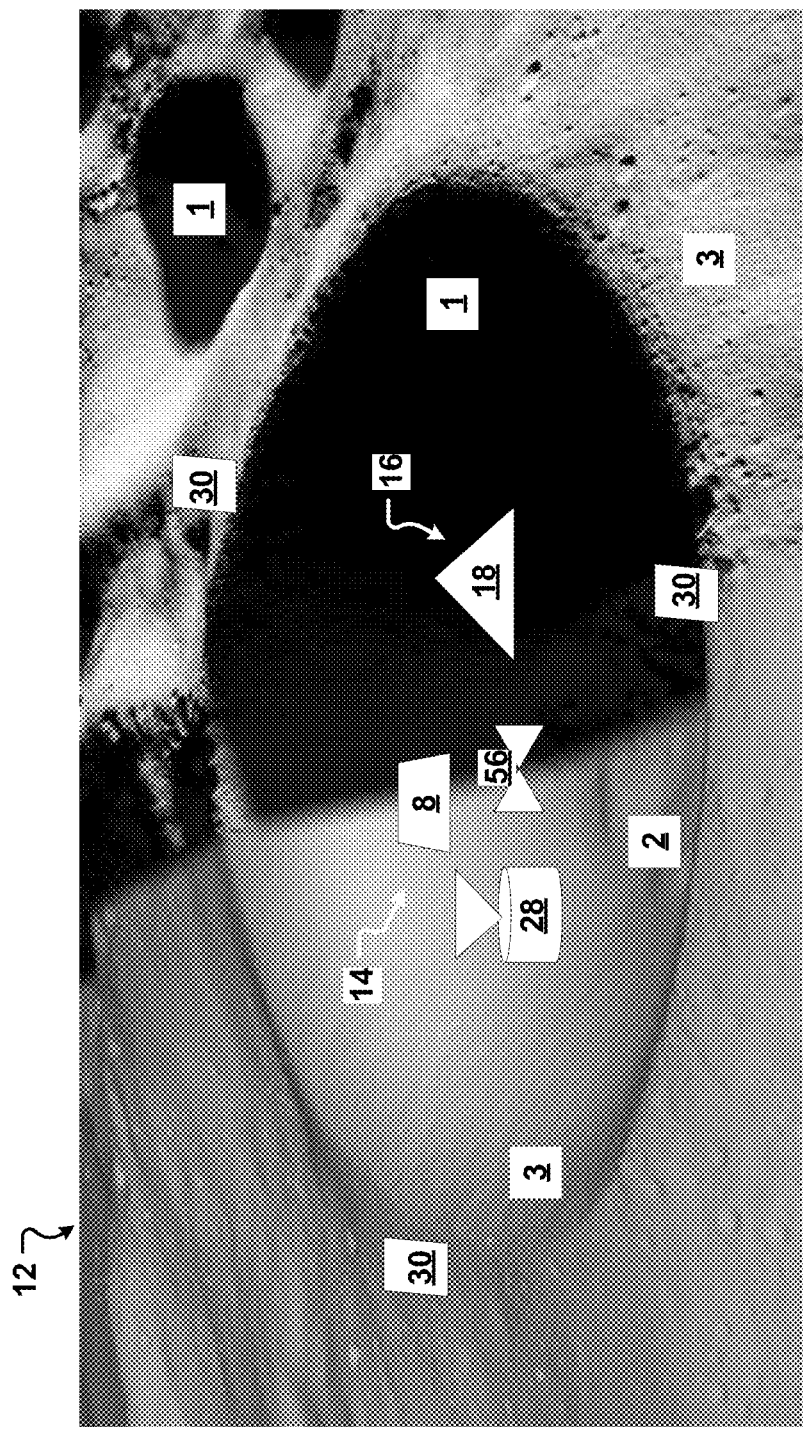
FIG. 1 illustrates a thermal system of the present invention positioned in a permanently shadowed region of a lunar crater.

To assist in the understanding of one embodiment of the present invention the following list of components and associated numbering found in the drawings is provided herein:

| Number | Description |
| --- | --- |
| 1 | Permanently or predominately shadowed region |
| 2 | Regolith or water entrained soil |
| 3 | Sunlit region |
| 4 | Borehole |
| 6 | Water vapor |
| 8 | Landing site |
| 10 | Spacecraft |
| 12 | Production site |
| 14 | Thermal system |
| 16 | Enclosure |
| 17 | Skirt |
| 18 | Body |
| 20 | Interior surface of body |
| 21 | Rod |
| 22 | Window or optics of enclosure |
| 23 | Collector |
| 24 | Container |
| 25 | Radiator |
| 26 | Conduit |
| 27 | Vein structure |
| 28 | Solar power system |
| 29 | Interior of container |
| 30 | Mirror or solar concentrator |
| 31 | Exterior surface of container |
| 32 | Sunlight |
| 33 | Interior surface of container |
| 34 | Fluid system |
| 35 | Base of solar concentrator |
| 36 | Pipe |
| 38 | Pump |
| 40 | Power line |
| 42 | Electric heater |
| 44 | Water processing facility |
| 46 | Water storage system |
| 48 | Water purification plant |
| 50 | Water splitting facility |
| 52 | Hydrogen storage tank |
| 54 | Oxygen storage tank |
| 56 | Vehicle |
| 58 | Wheels |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Referring now to FIGS. 1-5, a thermal system 14 of one embodiment of the present invention is generally illustrated. The thermal system 14 is configured to extract water from soil or a regolith 2 present at a production site 12. The thermal system 14 can be used to recover water from any type of soil or regolith at any location. In one embodiment, the production site is located on the Moon. Alternatively, the production site 12 may be on the Earth, an asteroid, or Mars.

The thermal system 14 generally includes an enclosure 16, a container 24, and a solar power system 28. The enclosure 16 has a body 18. A lower end of the body 18 is open. The enclosure 16 is configured to be positioned over a regolith 2, which includes frozen water, with the open lower end facing the regolith. In one embodiment, the enclosure body 18 is generally dome shaped. The enclosure 16 acts as a barrier between the regolith 2 and space or the atmosphere outside of the enclosure. Specifically, in one embodiment, a cross-section of the enclosure body has a shape that is generally arcuate.

The enclosure 16 can be of any predetermined size and shape. In one embodiment, the enclosure 16 has a diameter of from about 10 meters to about 40 meters. In another embodiment, the enclosure 16 has a diameter of approximately 29 meters. Optionally, the enclosure can cover approximately 650 square meters of the regolith. However, one of skill in the art will appreciate that the enclosure may be of any size or shape. The enclosure 16 can be moveable with respect to the regolith 2. Accordingly, the enclosure 16 can be periodically repositioned at the production site 12 to mine water ice from different areas of the regolith.

According to various embodiments of the present invention, the thermal system 14 can be transported to and assembled on the Moon. The enclosure body 18 and other components can be constructed of a foldable and/or flexible material, such as mylar, plastic or latex. At least some of the components of the thermal system 14 can be collapsed and packed to a predefined volume to conform the components to a particular volume as necessitated by the launch requirements. In one embodiment, the enclosure 16 of the thermal system 14 is self-deployable, such that the enclosure can be transported to the surface of the Moon and then opened.

The enclosure body 18 can optionally include structural elements configured to automatically transition from a stored state to a deployed state. The structural elements can include struts. The struts can be configured to work in tension and/or compression. The struts can be configured to transform the enclosure body 18 from the stored state to the deployed state. The struts can be expandable. For example, in one embodiment the structural elements are telescoping. In another embodiment, the struts include folding supports linked in a crisscross pattern, such as a scissor lift. Optionally, one or more of the struts can include a piston actuated by a fluid. Additionally, or alternatively, the structural elements can be inflatable. In one embodiment, the structural elements can be inflated by a gas. The gas can be air, Helium, $CO_2$ or another gas, such as a waste gas from a rocket.

In one embodiment, when the enclosure 16 is positioned at a product site, the structural elements may be filled with the gas to self-deploy. The structural elements can be configured to remain flexible after being deployed. Alternatively, the structural elements can lock once deployed permitting the enclosure 16 and attached components to be moved without disrupting the structure. Further, the thermal system 14 can include skids on a bottom surface which allow the thermal system 14 to be dragged to a mining location or production site 12 without repacking the thermal system 14. More specifically, once deployed, the thermal system 14 can be moved to a new location without being refolded or returned to the stored state. In one embodiment, a vehicle 56 can be used to move the enclosure 16.

The enclosure 16 includes a container 24 to collect water released from the regolith. The container 24 may be releasably interconnectable to the enclosure body 18. A conduit 26 can direct water from the enclosure body 18 to the container.

In one embodiment, the container 24 is positioned outside of the enclosure body 18. Accordingly, the conduit 26 may be interconnected to an aperture through the enclosure body. The aperture for the conduit 26 can be spaced from a lower end of the enclosure 16. In one embodiment, the enclosure body 18 includes a plurality of apertures for containers 24. Optionally, the plurality of apertures define an area of approximately 2 m².

Figure 2:
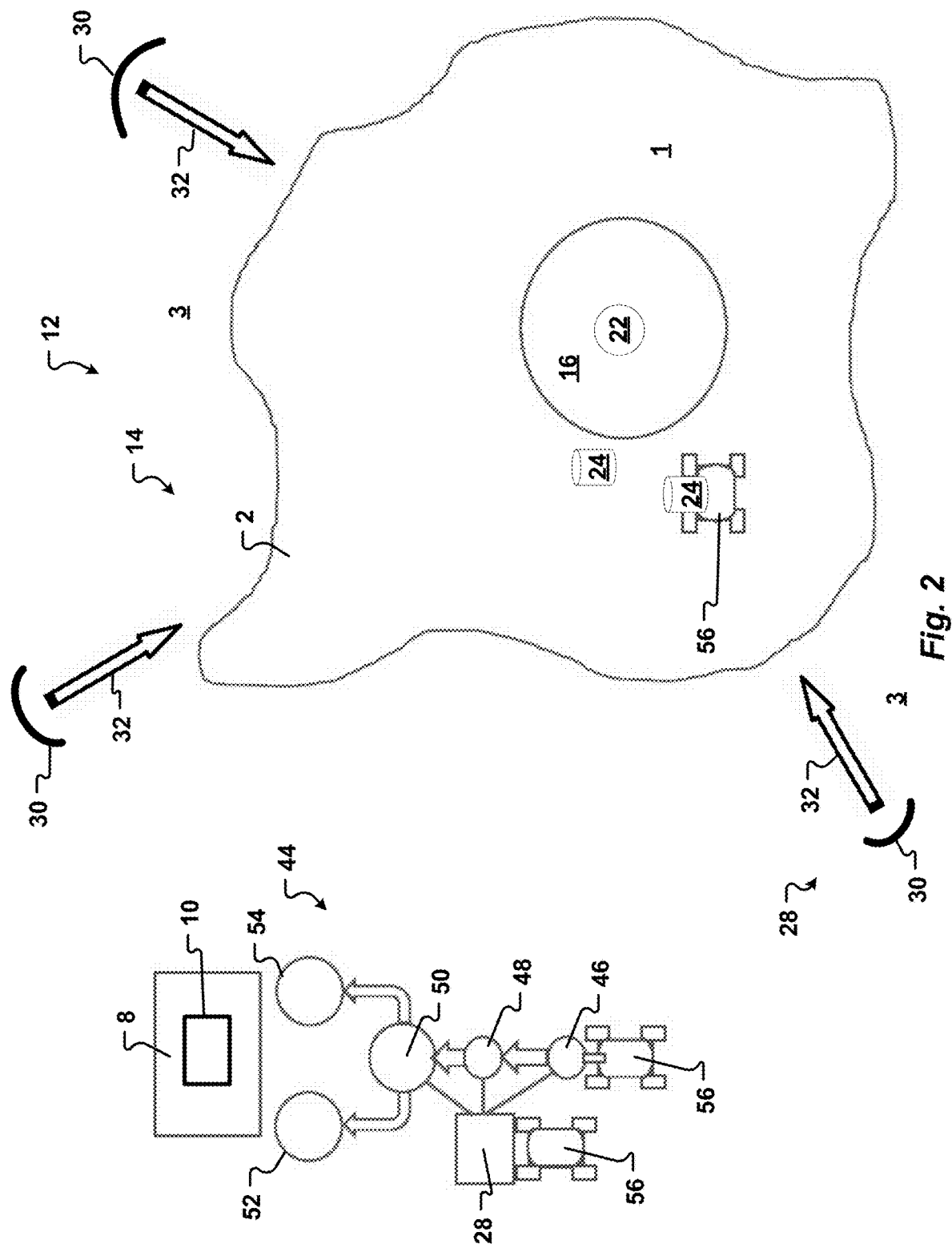
FIG. 2 is a schematic view of one embodiment of the thermal system of the present invention.

In one embodiment, the container 24 is mobile. For example, the container 24 can be positioned on a cart or vehicle 56 as generally illustrated in FIG. 2. Alternatively, and referring now to FIG. 5, the container can include a motor to drive wheels 58 and/or tracks or belts. The motor can be powered by electricity. Accordingly, the container 24 can be used to move the enclosure 16 to a production site, or from a first portion of the production site to a second portion of the production site.

Figure 3:
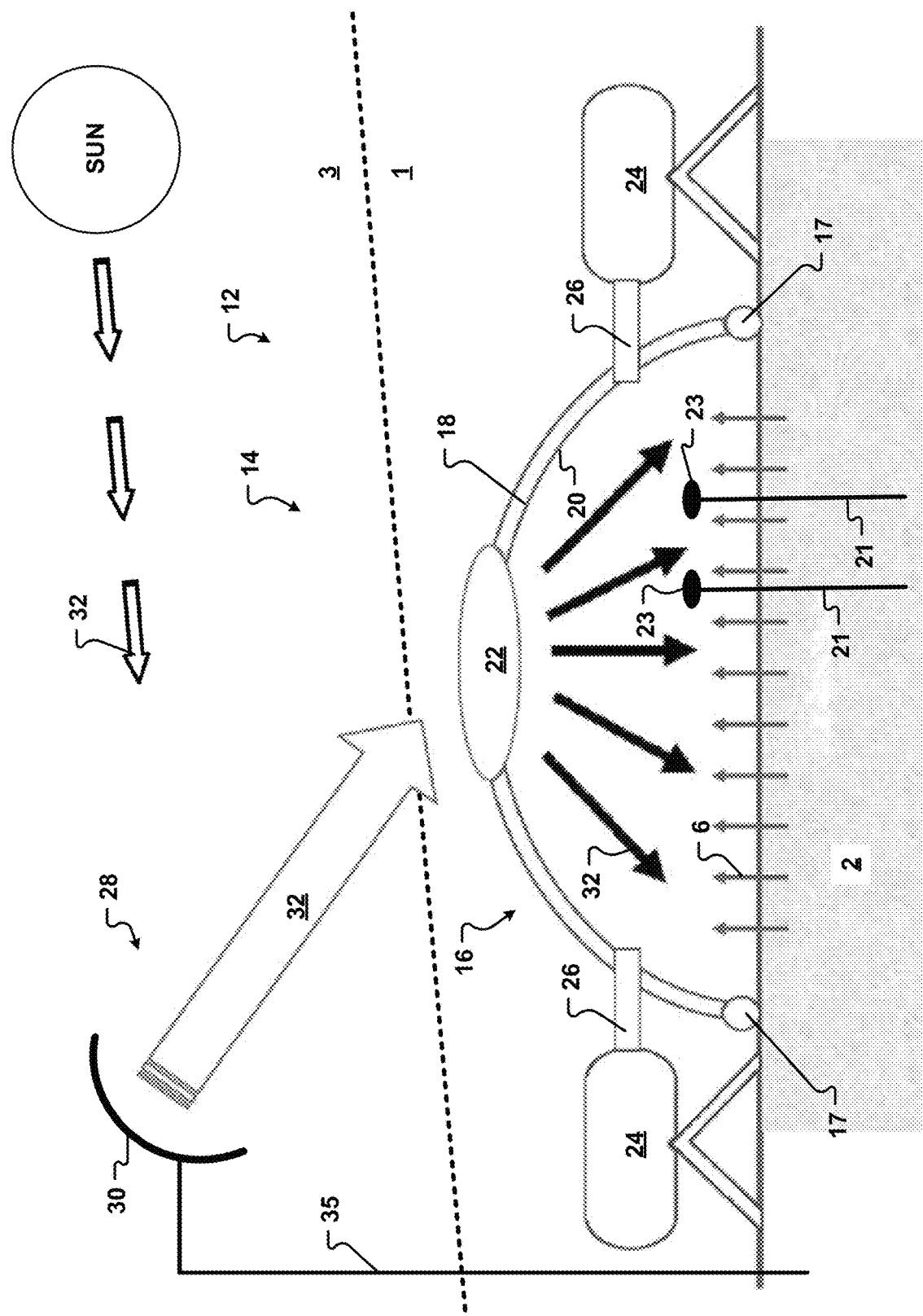
FIG. 3 is a front elevation view of an enclosure and associated components of one embodiment of the thermal system.

When the body 18 is positioned over the regolith 2, the thermal system 14 directs energy from the solar power system 28 to the regolith. The thermal system 14 can increase the temperature of the regolith from a point at which water is frozen to a temperature at which the water will melt. Optionally, the thermal system 14 can raise the temperature of the regolith to a point at which the water will sublimate or vaporize. In one embodiment, the thermal system 14 can increase the temperature of the regolith by at least about 180 K. More specifically, in one embodiment, the thermal system 14 can increase the temperature of the regolith from less than about 60 K to at least about 220 K. In one embodiment, the thermal system 14 can heat the regolith under the enclosure 16 to a temperature of less than approximately 270 K. When the regolith is warmed to about 220 K, water ice in the regolith 2 can change phase from solid water to a water vapor 6 as generally illustrated in FIG. 3. The water vapor 6 escapes from the regolith 2 and is maintained (or trapped) within the enclosure body 18. In addition, the temperature within the enclosure body 18, and thus the water vapor 6, is greater than the temperature outside the enclosure body.

According to embodiments of the present invention, heating the regolith creates an atmosphere within the enclosure 16. The atmosphere may be many orders of magnitude lower than that of the Earth. The pressure within the enclosure can be nearly a vacuum, for example between about 1.0 Pascals and about 100 Pascals. In some embodiments, the atmosphere within the enclosure is about 10 Pascals. In one embodiment, when the thermal system 14 heats the regolith under the enclosure 16, pressure within the enclosure increases to less than approximately 2 PSI, much less than 14.7 PSI (the pressure of the Earth's atmosphere at sea level). In one embodiment, the pressure within the enclosure increases to less than 1 PSI when the thermal system 14 heats the regolith.

Due to the extremely low pressure within the enclosure, the mean free path of individual water molecules of the water vapor 6 is at least one centimeter to several centimeters. Accordingly, the water molecules of the water vapor 6 will "bounce around" within the enclosure 16 until entering the container 24 through a conduit 26. The present invention contemplates that water molecules within the enclosure 16 will be in a non-continuum flow regime. Accordingly, collisions between water vapor 6 molecules will be rare. The water molecules of the water vapor will thus move about the enclosure 16 randomly until entering the conduit 26 and then moving into the container 24. Once a water molecule enters the container, the water molecule will lose energy and return to a solid state as water ice. In one embodiment, the conduit 26 and/or the container 24 are adapted to prevent molecules of the water vapor 6 from bouncing or moving out of the container 24. For example, the conduit 26 or the container 24 can be configured to direct water molecules into the container 24 and to prevent the movement of water molecules out of the container 24. In one embodiment, one or more of the conduit 26 and the container 24 include a restriction, or narrowing, to prevent movement of water molecules out of the container 24.

The container 24 may be unheated. Accordingly, in one embodiment, water collected within the container will cool and subsequently freeze. In one embodiment, the container 24 can be cooled to a temperature that is lower than the temperature within the enclosure. For example, the container 24 can radiate heat to the atmosphere outside of the enclosure 16. Alternatively, the container 24 can be heated to a predetermined temperature.

In another embodiment, the container 24 is a cold trap configured to capture gaseous water. As discussed herein, the temperature of the water vapor 6 is greater than the temperature outside the enclosure 16. Thus, if the temperature of the container 24 is below the temperature of the water vapor 6, water vapor 6 that enters the container 24 will refreeze and remain in the container 24. In one embodiment, the thermal system 14 is configured to cool the container 24 to a temperature at which water vapor will change state into water ice.

The interior volume of the container 24 can be between about 0.25 m³ and about 4 m³. In some embodiments, the interior volume of the container 24 is about 2 m³. The container 24 can be of any shape, including one or more of a cylindrical shape, a rectangular or cubic shape, or a spherical shape. In some embodiments, the container 24 is hollow, while in other embodiments, the container 24 is at least partially filled or contains a porous inner structure.

Figure 3A:
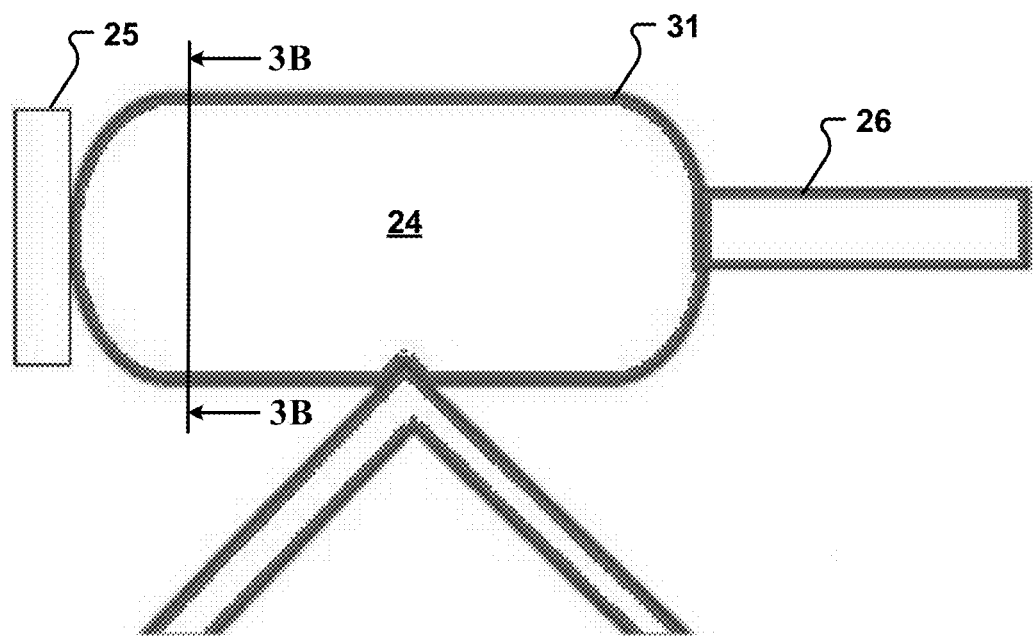
FIG. 3A is a side elevation view of a container according to an embodiment of the present invention.

The container 24 can be constructed of a metal, such as an aluminum, or a composite material, such as plastic. Furthermore, in some embodiments the container 24 is constructed of an inflatable and/or flexible or foldable material, such as Kevlar or mylar. In one embodiment, the container is configured to have a first volume for transport into space. In this embodiment, when the container is positioned at a production site 12, such as the Moon, the container can expand to a second greater volume to store water. Optionally, struts or other structural elements can be provided to maintain the shape of the container. The struts can be expandable. In one embodiment, the struts can be inflatable by a gas. In these embodiments, the container 24 can be self-deployable. Referring now to FIG. 3A, the container 24 can be configured to release heat from an interior 29 of the container to the environment outside of the enclosure 16. The container 24 can cool the interior 29 to a temperature that is less than the temperature within the enclosure 16. Optionally, the container 24 may be configured to reduce the temperature within the container interior 29 to be approximately equal to the ambient temperature of soil or regolith 2 outside of the enclosure. For example, the container 24 can be operable to cool the interior 29 to a temperature of less than approximately 60K. In one embodiment, the container 24 can passively radiate excess heat to the environment outside of the enclosure. More specifically, in one embodiment, the container 24 can cool the container interior 29 without the use of electricity, compressors, or pumps.

In some embodiments, the container 24 includes a radiator 25 on the outside of the container 24, and exterior to the enclosure 16. The radiator 25 is configured to radiate heat from an interior 29 of the container 24 into space and acts to dissipate heat from the water vapor 6 into space. In this manner, the radiator 25 is operable to cool the container 24 to a predetermined temperature, such as a temperature that is lower than the temperature within the enclosure 16. The radiator 25 can be of any size. In one embodiment, the size of the radiator 25 is proportional to the volume of the container 24 and the expected rate of water collection within the container 24.

The radiator may comprise fins that extend from an exterior surface 31 of the container 24. The radiator generally comprises a material selected to transmit heat. Optionally, the radiator 25 can be formed of a material that is the same as, or different from, the material of the container. In one embodiment, the radiator 25 comprises a metal.

The radiator can be configured to transfer heat to regolith 2 outside of the enclosure 16. In one embodiment, the radiator 25 is configured to be in contact with the regolith. Additionally, or alternatively, the radiator 25 can include an extension operable to be positioned in contact with the regolith. The extension can be flexible or bendable. In one embodiment, the extension comprises a chain, a cable or a wire. The extension can be made of a material selected to transfer heat from the radiator to the regolith. Accordingly, the extension may be a metal, such as steel, titanium, magnesium, aluminum, and a metal alloy.

Figure 3B:
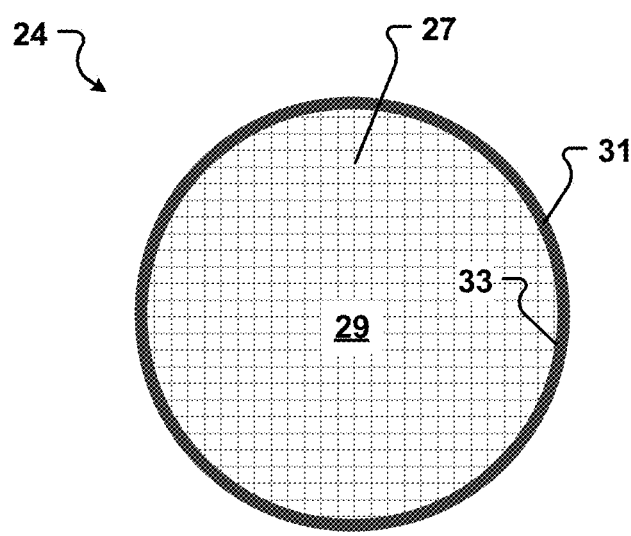
FIG. 3B is a cross-sectional view of the container along lines 3B-3B according to the embodiment of FIG. 3A.

Referring now to FIG. 3B, in various embodiments, the container 24 includes a vein structure 27 within the container interior 29. The vein structure 27 is operable to remove heat from within the interior 29 of the container 24. More specifically, the vein structure 27 is configured to create a passage or route for heat to move from within the container 24 to the exterior 31 of the container. In this manner, the vein structure provides a route for heat to dissipate out of the container 24 and ultimately out to space.

In one embodiment, the vein structure 27 generally extends from an interior surface 33 of the container into the interior 29 of the container. While the vein structure 27 is depicted as a crisscross pattern, it will be appreciated that the vein structure 27 may include other patterns and layouts. For example, the vein structure 27 can be a random pattern, a cross pattern, a hash pattern, a wavy pattern, and/or a zig zag pattern. Additionally, or alternatively, the vein structure 27 can comprise a plurality of individual veins or plates. The vein structure 27 can be flexible or bendable.

The vein structure 27 is formed of a material selected to transmit heat. Optionally, the vein structure 27 can be formed of a material that is the same as, or different from, the material of the container 24. In one embodiment, the vein structure 27 is formed of a metal, such as an aluminum. Optionally, the vein structure 27 may comprise one or more of wires, rods, and plates.

According to one embodiment of the present invention, the vein structure 27 includes hollow and/or porous passageways. The veins 27 can traverse the container 24 from the conduit 26 end to the radiator 25 end. The vein structure 27 also provides a volume for water vapor 6 to collect and freeze. In some embodiments, the vein structure 27 is in fluid connection with the radiator 25, such that heat flow is promoted from the container 24 to the radiator 25 while water vapor 6 remains trapped in the container 24.

An interior 29 of the container 24 can have a lower pressure than the pressure within the enclosure 16. More specifically, by cooling the container 24 as described herein, the interior volume 29 of the container can have a pressure that is less than the pressure within the volume of the enclosure 16 which is heated by the solar power system 28. Accordingly, water molecules of the water vapor 6 may be attracted to, or migrate into, the container 24 for collection. In one embodiment, pressure within the container interior 29 can be less than approximately 1.0 PSI, or less than approximately 0.5 PSI.

In one embodiment, an interior surface 20 of the enclosure body 18 is configured to cause water vapor 6 to condense into liquid water. For example, the interior surface 20 may be maintained at a temperature selected to cool the water vapor below its saturation point such that liquid water forms on the interior surface. Optionally, the interior surface 20 may include guides to direct water to the container 24.

In one embodiment, the solar power system 28 includes a mirror or concentrator 30. For example, in one embodiment the concentrator can reflect sunlight to the enclosure 16. Accordingly, in one embodiment, the concentrator 30 can be generally planar. Optionally, the concentrator 30 can be configured to concentrate the sunlight. Alternatively, in another embodiment, the concentrator can be generally concave. In one embodiment, the concentrator can include a lens. In another embodiment, the concentrator 30 has a fixed focal length. Alternatively, the concentrator 30 can have a focal length that is variable.

Referring now to FIG. 1, the concentrator 30 can be positioned to direct sunlight to the enclosure body 18. Optionally, the concentrator 30 may be positioned on a rim of a crater in which the production site 12 is located. More specifically, the concentrator 30 can be located at a position 3 that receives sunlight at least sometime. According to various embodiments of the present invention, the concentrator 30 can be spaced from the enclosure 16. More specifically, in one embodiment the enclosure 16 can be located in a permanently shadowed region 1, such as within a Lunar crater. The concentrator 30 can be located in a sunlit region 3.

Additionally, or alternatively, the concentrator 30 can be positioned outside or above a Lunar crater in which the enclosure 16 is positioned. For example, the concentrator can be positioned above a rim of a Lunar crater or in another sunlit region 3. The distance between the concentrator 30 and the enclosure 16 can be at least about 10 meters to about 3 to 10 kilometers. In one embodiment, the concentrator 30 is positioned in direct line of sight with the enclosure 16. Additionally, or alternatively, a second concentrator 30 can be located at a position that is not in direct line of sight with the enclosure. The second concentrator 30 may be a photovoltaic system that converts sunlight into electricity. Alternatively, the second concentrator 30 can be configured to transmit reflected sunlight to a first concentrator that subsequently transmits the sunlight to the enclosure. Optionally, the concentrator 30 can be mobile. For example, the concentrator can include a motor and a drive unit, such as wheels or tracks, to move the concentrator 30 to a sunlit region 3.

Referring now to FIG. 3, in one embodiment, the concentrator 30 includes a base 35. The base 35 can be configured to anchor the concentrator 30 to the regolith 2 in a predetermined orientation with respect to the enclosure 16. In one embodiment the base 35 is configured to expand or contract. For example, the base 35 can include a scissor lift, a piston, or telescoping feature. In this manner, the base can raise the concentrator 30 above the regolith 2 to a sunlit region 3 at which the concentrator 30 receives light 32 from the Sun. More specifically, the base 35 can position the concentrator 30 above a predominately shadowed region 1 in which the enclosure 16 is located.

The concentrator 30 of all embodiments can be configured to track the Sun and reflect sunlight 32 to the enclosure 16.

Optionally, the concentrator 30 can pivot or move substantially continuously to follow the Sun and direct sunlight 32 to the enclosure 16. In one embodiment, the concentrator 30 is configured to pivot or rotate relative to the base 35.

Optionally, the concentrator can be configured to transition from a transport configuration to an operational configuration. In the transport configuration the concentrator can fit into a volume that is less than a volume the concentrator can fit into when in the operational configuration. In one embodiment, the concentrator 30 can be configured to collapse, bend, and/or fold into the transport configuration for launch from the Earth into outer space.

Referring again to FIG. 3, the concentrator 30 can, in one embodiment, direct the sunlight 32 through the enclosure body 18 to heat the regolith 2 in situ. In one embodiment, the body 18 comprises a material that is transparent or generally translucent. In another embodiment, the body 18 includes a window or optics 22 configured to redirect light 32 within the enclosure body 18. Accordingly, the concentrator 30 may focus sunlight 32 onto the optics or through the window 22. In one embodiment, the window or optics 22 can focus light within the enclosure body. In another embodiment, the window or optics 22 disperse the light within the enclosure body and onto the regolith 2.

Optionally, an interior surface 20 of the body is reflective. In particular, the interior surface of the enclosure 16 can be configured to reflect infrared radiation to retain heat within the enclosure 16. In various embodiments, the enclosure 16 is resistant to cosmic radiation, provides insulation to retain heat, and/or is impermeable to gases, such as water vapor 6. In some embodiments, the material comprising the enclosure 16 will transmit heat or light from the Sun into the interior volume defined by the enclosure body, while an inner surface 20 of the enclosure body 18 will reflect infrared radiation inwardly. In addition, combinations of materials, such as one or more of Kevlar, mylar, plastic, and aluminum may be used to construct the enclosure. For example, in one embodiment, portions of the inner surface of the enclosure 16 can be lined or coated with a material to reflect infrared radiation. The window 22 can be unlined or uncoated. Additionally or alternatively, the enclosure body 18 can comprise Kevlar, mylar, plastic, or a mix of two or more materials. In one embodiment, the enclosure is lined or coated with a material that can transmit predetermined wavelengths of light but will reflect other wavelengths of light. For example, in one embodiment the enclosure can transmit a range of wavelengths of visible light but will reflect longer wavelengths of light, such as in the infrared region of the spectrum. In one embodiment, the enclosure body 18 is configured to transmit light with a wavelength of less than about 800 nm and to reflect light with a wavelength of greater than about 800 nm.

In one embodiment, the thermal system can include rods 21 to transfer heat into the soil as generally illustrated in FIG. 3. The rods 21 can be driven at least partially into the regolith 2. The rods 21 can be formed of a material that can transmit heat. In one embodiment, the rods 21 are formed of a metal, such as one or more of steel, titanium, magnesium, aluminum, and a metal alloy. Optionally, a collector 23, which may be a plate, can be affixed to an end of the rod 21. The collector 23 can be configured to collect heat energy from within the enclosure and to transfer this energy to the rod 21. Heat energy is then transferred from the collector 23 through the rod 21 to the soil or regolith 2 to heat ice within the soil. Soils that contain about 5% to about 10% ice/water content by mass will transfer heat well. Accordingly, rods 21 can be used to transfer heat into regolith 2 with a greater than about 5% water content by mass.

Additionally, the enclosure 16 can optionally include a skirt 17. The skirt 17 is configured to conform the enclosure 16 to the ground surface. In this manner, generally prevents an excessive amount of water vapor from escaping from the enclosure 16. More specifically, the skirt 17 is configured to control leakage of water vapor 6 out of the enclosure to space by minimizing leakage points between the ground surface and the bottom of the enclosure 16. According to various embodiments of the present invention, the skirt 17 is a soft material, such silicone or foam. In other embodiments, the skirt 17 can include material that drops down from the bottom of the enclosure 16 to fill irregularities in the surface of the ground. For example, the skirt 17 can include fabric flaps. The fabric may be made from Kevlar, mylar, or similar materials. The skirt 17 can be weighted to pull the material down into irregularities in the ground surface. In yet another embodiment, the skirt 17 is constructed of a moldable material. The moldable material of the skirt 17 can conform to the ground surface when the enclosure 16 is positioned at a production site 12. In one embodiment, the skirt 17 can be configured to provide support to the enclosure. More specifically, the skirt 17 may increase the rigidity of the enclosure to prevent it from collapsing.

The skirt 17 defines a leakage rate of the enclosure 16. According to embodiments of the present invention, the skirt 17 is configured to limit leakage of water vapor 6 from the enclosure to less than 10%. The leakage rate is generally equal to the area of all gaps between the skirt 17 and the regolith 2. The leakage rate prevents inadvertent or unintended movement of the enclosure 16 due to build-up of pressure from water vapor 6 within the enclosure 16. More specifically, if pressure within the enclosure 16 becomes too high, the skirt 17 of the enclosure may lose contact with the regolith and allow water vapor to escape from the enclosure at an unacceptable rate, decreasing the efficiency of the system. In some embodiments, the leakage rate is equal to 10% of the cross-sectional area of the conduit 26. For example, in one embodiment, the skirt 17 is configured to form a seal between the surface of the ground and the enclosure with gaps that total less than approximately 0.2 $m^2$. The cross-sectional area of the entrance to the conduit 26 can be sized based on an anticipated leak rate of the enclosure 16.

Figure 4:
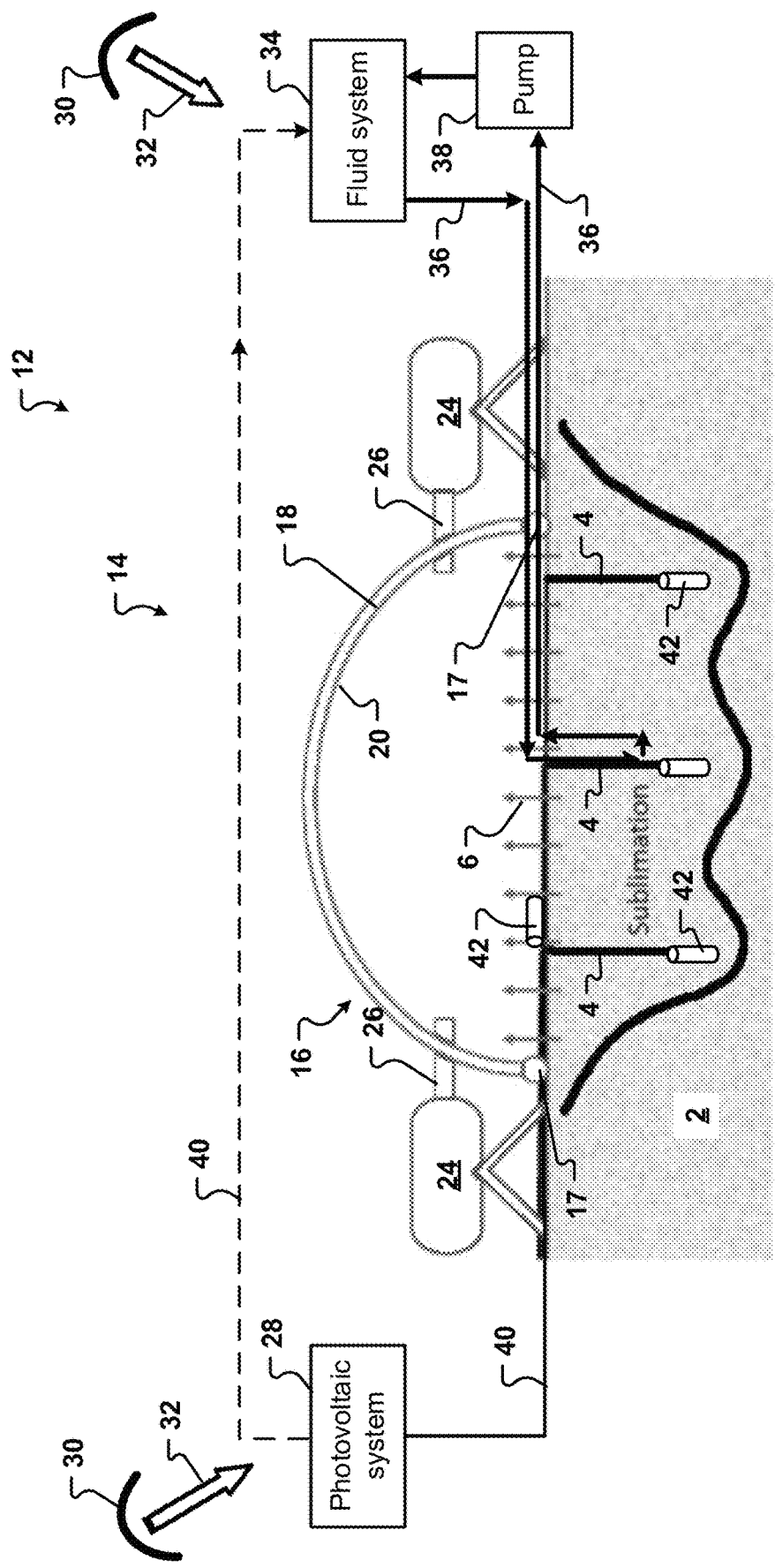
FIG. 4 is a front elevation view of another embodiment of a thermal system of the present invention.
Figure 5:
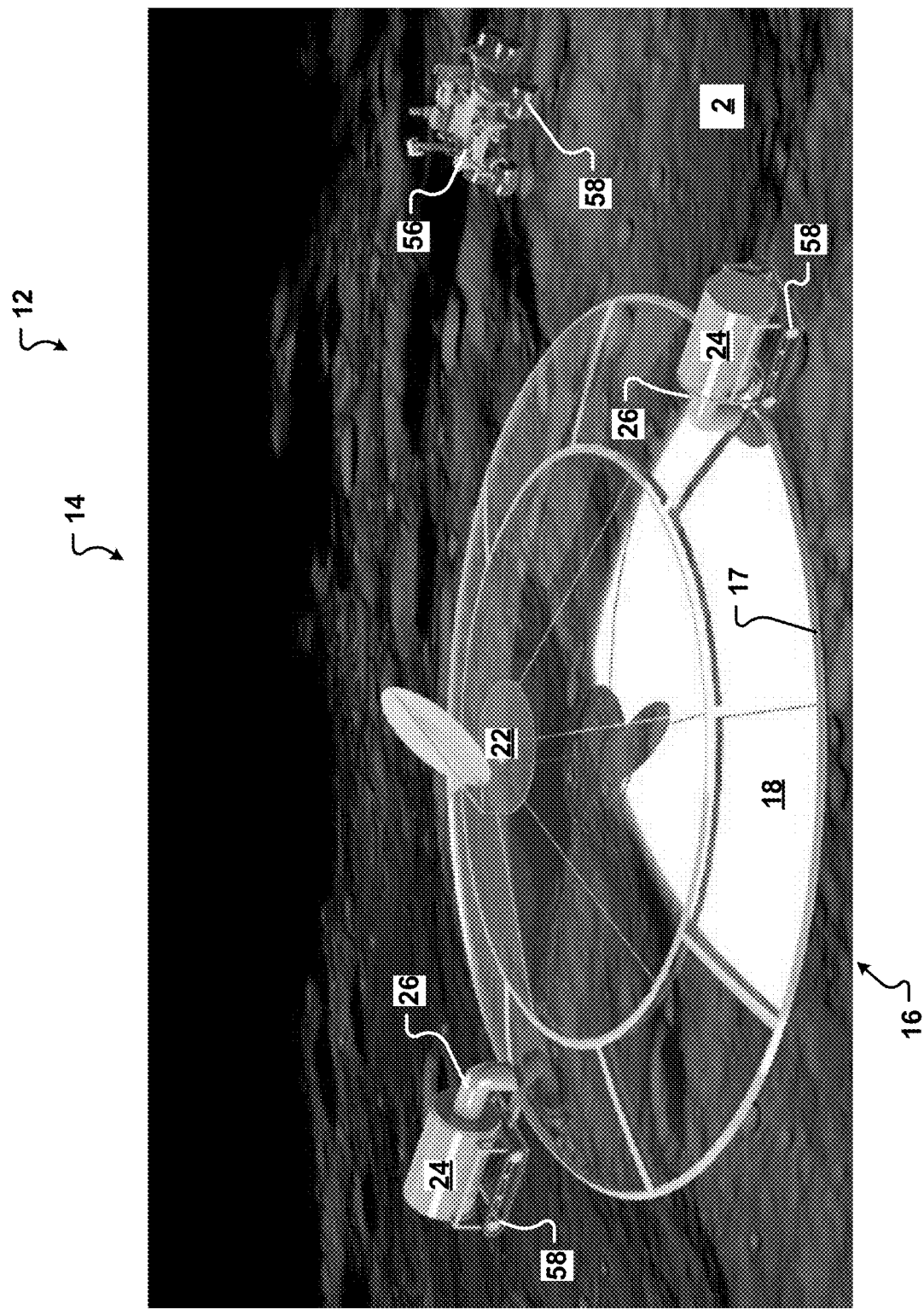
FIG. 5 is a perspective view of components of a thermal system of yet another embodiment of the present invention.

Referring now to FIG. 4, boreholes 4 may optionally be formed in the regolith 2. The thermal system 14 can direct energy into the boreholes 4 to heat the regolith 2 to a predetermined depth. More specifically, in one embodiment, electric heaters 42 are positioned within the boreholes 4. Heaters, such as an electric heater 42, can be used when heating from sunlight is insufficient. Additionally, or alternatively, an electric heater 42 can be positioned on the surface of the regolith. Electricity for the electric heaters can be provided by a power line 40. The power line may be associated with a photovoltaic system 28 or other source of electricity.

In another embodiment, the thermal system 14 can include a fluid system 34 to deliver heated fluid to the regolith 2. A conduit, such as a hose or a pipe 36 from the fluid system 34, transports the heated fluid within the enclosure 16. The pipe 36 may be positioned on the surface of the regolith 2. In one embodiment, a portion of the pipe 36 may extend into a borehole 4. Additionally, or alternatively, the pipe 36 may be positioned in a trench in the regolith.

Optionally, the fluid system 34 may include a solar concentrator 30 configured to heat the fluid. Additionally, or alternatively, the fluid system 34 may use electricity from the photovoltaic system 28 or another power source to heat the fluid. The fluid system 34 may also include at least one pump 38 to circulate the fluid through the pipe 36.

Referring now to FIGS. 1-2, the production site 12 may be positioned proximate to a landing site 8 for a spacecraft 10. Optionally, the production site 12 includes a power generation system 28. The power generation system 28 may optionally be a photovoltaic system.

The thermal system 14 optionally includes a vehicle 56. The vehicle 56 is operable to transport containers 24 around the production site 12. For example, the vehicle 56 can transport containers 24 with water to a processing facility 44. The processing facility 44 may include a water storage system 46. The vehicle 56 can transport a container 24 with water to the water storage system 46 where the water is removed from the container. An empty container 24 may then be transported to the enclosure 16 by the vehicle. The vehicle 56 can be powered by electricity received from the power generation system 28. Optionally, the vehicle 56 can be configured to move the enclosure 16 within the production site 12. For example, the vehicle 56 can push or pull the enclosure 16 from a first location to a second location of the production site 12. In this manner, when production of water at the first location decreases or stops, the vehicle 56 can be used to move the enclosure 16 to the second location to continue production of water at the production site 12.

In one embodiment, the processing facility 44 includes a water purification plant 48. The water purification plant 48 can purify the water. The water can optionally be split into hydrogen and oxygen by a water splitting facility 50. For example, the water splitting facility 50 may use an electrolysis process to split the water into hydrogen and oxygen using electricity from the solar power system 28. Liquid (or gaseous) hydrogen can then be stored in a tank 52. Oxygen may be stored in another tank 54. Hydrogen and/or oxygen may then be provided to a spacecraft 10 at the landing site 8.

The thermal system of the present invention provides many benefits. Water, as well as hydrogen and oxygen produced from the water, may be sold for use in space. The hydrogen and oxygen can be used as fuel for spacecraft. In this manner, less mass must be lifted from the Earth's surface, reducing launch costs. Hydrogen and oxygen produced by the thermal system 14 can be transported to low Earth orbit. There, the hydrogen and oxygen can be transferred to a spacecraft and used as fuel to lift a satellite from low Earth orbit a higher orbit, such as to geostationary orbit or the Moon. The cost of lifting payload to the lunar surface can be reduced by up to about 66%. Using the systems and methods of the present invention, the cost of a mission to Mars may be reduced by at least about 50% and up to about 66%.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A system to extract frozen water from a soil in a low pressure environment and collect the water, comprising:
    an enclosure configured to be positioned on the soil at a first location, the enclosure configured to define an enclosed space above the soil at the first location, the enclosure being configured to transmit solar energy from an exterior of the enclosure into the enclosed space and to retain heat within the enclosed space;
    a container with an internal chamber, the container positioned exterior to the enclosure and interconnected to the enclosure such that water vapor within the enclosed space can move into the internal chamber for collection, wherein the container is configured to freeze water vapor in the internal chamber;
    a radiator positioned exterior to the container and the enclosure and operably interconnected with the container and operable to cool the internal chamber of the container to a temperature that is lower than a temperature of the soil within the enclosed space defined by the enclosure, wherein the radiator includes an extension adapted to contact the soil to transfer heat from the radiator to the soil; and
    a solar concentrator configured to be positioned at a second location, the solar concentrator operable to direct solar energy to the enclosure to heat the soil within the enclosed space at the first location and cause frozen water in the soil at the first location to sublimate to a gaseous state.

2. The system of claim 1, wherein the system is operable to collect frozen water from soil on the Moon, a planet, or an asteroid, and wherein the enclosure, the container, and the solar concentrator are packed within a payload fairing of a space launch vehicle.

3. The system of claim 1, wherein the solar concentrator comprises a base operable to alter a height of the solar concentrator relative to a surface of the soil.

4. The system of claim 1, wherein the extension is a chain, a cable, or a wire, and wherein the extension is fabricated from a flexible or bendable material that is selected to transfer heat from the radiator to the soil such as a metal or metal alloy.

5. The system of claim 1, wherein the solar concentrator is a mirror, wherein the solar concentrator is configured to be positioned at the second location with a second elevation that receives at least some sunlight such that the solar concentrator is spaced from the enclosure, the enclosure being configured to be positioned in the first location with a first elevation that receives substantially no sunlight, wherein the first elevation is lower than the second elevation.

6. The system of claim 1, wherein the container has a transport configuration in which the container is packed within a payload fairing of a space launch vehicle, and wherein the container has a production configuration in which the container is operable to collect frozen water from the soil on the Moon, a planet, or an asteroid.

7. The system of claim 1, wherein the enclosure comprises a material that is impermeable to water vapor, and wherein the material of the enclosure can transmit solar energy from the solar concentrator through the enclosure and into the enclosed space.

8. The system of claim 1, wherein a vein structure extends from an interior surface of the container into the internal chamber, the vein structure configured to transmit heat to the radiator.

9. The system of claim 1, wherein the solar concentrator is configured to be positioned at least 10 m from the enclosure.

10. The system of claim 1, wherein the system is operable to heat the soil under the enclosed space to a temperature of between approximately 200 K and approximately 270 K such that a pressure within the enclosed space defined by the enclosure increases to less than approximately 1 pound per square inch.

11. The system of claim 1, wherein the enclosure further comprises a skirt operable to conform to the surface of the soil.

12. The system of claim 1, wherein the enclosure is transportable between the first location and a third location, wherein the enclosure is configured to be positioned on the soil at the third location, wherein the enclosure is configured to define a second enclosed space above the soil at the third location and cause frozen water in the soil at the third location to sublimate to a gaseous state, and wherein the enclosure includes a window configured to receive solar energy directed by the solar concentrator at the enclosure, and redirect the received solar energy by either focusing the solar energy within the enclosure or dispersing the solar energy onto the soil.

13. The system of claim 1, wherein the enclosure comprises a material capable of transmitting light with a wavelength of less than about 800 nm and reflecting light with a wavelength of greater than about 800 nm, wherein the enclosure comprises at least one foldable and flexible material, wherein the enclosure has a stored state with a first volume and a deployed state with a second volume greater than the first volume, and wherein the foldable and flexible material comprises at least one of a Kevlar, a mylar, a plastic, an aluminum, and combinations thereof.

14. The system of claim 1, wherein the enclosure has an approximate diameter that ranges between 10 meters and 40 meters.

15. The system of claim 14, wherein the enclosure has an approximate diameter of 29 meters, and wherein the enclosure is configured to cover approximately 650 square meters of soil.

16. The system of claim 1, wherein the radiator is operable to cool the internal chamber of the container to a temperature of less than approximately 60 K, and wherein the container is operable to contain a pressure of less than approximately 1.0 pound per square inch.

* * * * *